United States Patent
Huang et al.

(10) Patent No.: US 10,523,032 B2
(45) Date of Patent: Dec. 31, 2019

(54) CHARGING APPARATUS WITH MULTIPLE POWER PATHS

(71) Applicant: RICHTEK TECHNOLOGY CORPORATION, Zhubei, Hsinchu (TW)

(72) Inventors: Wei-Jen Huang, New Taipei (TW); Chih-Hua Hou, Hsinchu (TW); Fu-Chi Lin, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 14 days.

(21) Appl. No.: 16/006,633

(22) Filed: Jun. 12, 2018

(65) Prior Publication Data

US 2018/0375362 A1 Dec. 27, 2018

Related U.S. Application Data

(60) Provisional application No. 62/523,630, filed on Jun. 22, 2017.

(30) Foreign Application Priority Data

May 28, 2018 (CN) .......................... 2018 1 0521752

(51) Int. Cl.
| | |
|---|---|
| *H02J 7/00* | (2006.01) |
| *H02J 50/10* | (2016.01) |
| *H02J 7/04* | (2006.01) |
| *H02J 7/02* | (2016.01) |
| *H02M 1/10* | (2006.01) |

(Continued)

(52) U.S. Cl.
CPC .......... *H02J 7/0072* (2013.01); *H02J 7/0055* (2013.01); *H02J 7/022* (2013.01); *H02J 7/025* (2013.01); *H02J 7/04* (2013.01); *H02J 50/10* (2016.02); *H02M 1/10* (2013.01); *H02M 3/07* (2013.01); *H02M 3/158* (2013.01); *H02M 7/2176* (2013.01)

(58) Field of Classification Search
CPC ...... H02J 7/0072; H02J 7/0022; H02J 7/0055; H02J 7/025
USPC ........................................................ 320/108
See application file for complete search history.

(56) References Cited

U.S. PATENT DOCUMENTS 7,948,781 B2 * 5/2011 Esaka ..................... H01F 38/14
363/67
8,830,707 B2 * 9/2014 Yamanaka ............ H02M 5/293
363/50

(Continued)

*Primary Examiner* — Yalkew Fantu
(74) *Attorney, Agent, or Firm* — Tung & Associates

(57) ABSTRACT

A charging apparatus includes a DC switch circuit, a wireless power unit, a capacitive power conversion unit, and a switching power conversion unit. The charging apparatus operates in at least one of the following modes: in a constant current mode, the capacitive power conversion unit converts a bus current provided by the DC switch circuit or the wireless power unit to generate a predetermined constant charging current on a charging node to charge a battery; in a constant voltage mode, the switching power conversion unit converts a bus voltage provided by the DC switch circuit or the wireless power unit to generate a predetermined charging voltage on the charging node to charge the battery; in a first power output mode, the switching power conversion unit converts the battery voltage to generate an output voltage on a transmission interface pin.

11 Claims, 14 Drawing Sheets

(51) Int. Cl.
*H02M 3/07* (2006.01)
*H02M 3/158* (2006.01)
*H02M 7/217* (2006.01)

(56) References Cited

U.S. PATENT DOCUMENTS

| | | | |
|---|---|---|---|
| 2009/0096413 A1* | 4/2009 | Partovi | H01F 5/003 320/108 |
| 2012/0051100 A1* | 3/2012 | Alexander | H02M 3/1582 363/37 |
| 2013/0307468 A1* | 11/2013 | Lee | H02J 7/0052 320/108 |
| 2017/0133889 A1* | 5/2017 | Yeo | H02J 50/80 |
| 2018/0083457 A1 | 3/2018 | Huang | |
| 2018/0083458 A1 | 3/2018 | Huang et al. | |
| 2018/0083459 A1 | 3/2018 | Huang et al. | |

* cited by examiner

CHARGING APPARATUS WITH MULTIPLE POWER PATHS

CROSS REFERENCE

The present invention claims priority to U.S. 62/523,630, filed on Jun. 22, 2017, and CN 201810521752.0, filed on May 28, 2018.

BACKGROUND OF THE INVENTION

Field of Invention

The present invention relates to a charging apparatus. Specifically, it relates to a charging apparatus with multiple power paths.

Description of Related Art

FIG. 1 shows a block diagram of a prior art charging apparatus (charging apparatus 1). The charging apparatus 1 includes a switching charging circuit 60 with 2 input power pins (VBUS1 and VBUS2 as shown in the figure). The charging apparatus 1 receives a power provided by for example an adaptor through a transmission interface pin 20 and the input power pin VBUS1, or receives a power provide by a wireless power unit 40 through the input power pin VBUS2. The wireless power unit 40 receives a wireless input voltage VAC through a wireless receiver coil L1, and converts the wireless input voltage VAC to a DC voltage VWP. The switching charging circuit 60 operates by switching power conversion, to convert one of the two power sources described above to a charging power (e.g. VBAT as shown in the figure) to charge a battery 50 with a constant current (constant current mode) or a constant voltage (constant voltage mode), or to supply power (e.g. VSYS as shown in the figure) for a system circuit 70.

The prior art of FIG. 1 has several disadvantages. First, an extra power path will be necessary for direct charging if it is desired to charge the battery with a larger constant current through the transmission interface pin 20 or the wireless power circuit 40. Second, if it is desired to raise the charging current, for example to 8 A or higher, with an adaptor capable of direct charging to expedite the charging time, a specially-designed fast charging cable with a larger diameter is required. However, it is inconvenient to use the fast charging cable because it is a non-standard cable less flexible for accommodation due to its larger diameter. Also, in this prior art, the configuration of two input power pins (i.e. VBUS1 and VBUS2) of the switching charging circuit 60 causes higher cost and larger circuit size.

Compared to the prior art in FIG. 1, the present invention is advantageous in providing a scale-up charging current for charging a battery to shorten the charging time, while a standard cable such as a USB compliant cable can be used, through which only a relatively lower current is allowed. In addition, the charging apparatus of the present invention comprises multiple power paths which include multiple power input sources and various power conversion schemes. Hence, to meet different requirements for charging a battery or supplying power to a system circuit, an optimized combination of the power source and the power conversion scheme can be correspondingly selected for optimized efficiency.

Relevant prior art patents are US 2018/0083459, US 2018/0083457, US 2018/0115025, and US 2018/0083458, which solve the issue by different approaches from the present invention.

SUMMARY OF THE INVENTION

From one perspective, the present invention provides a charging apparatus. The charging apparatus comprises: a DC switch circuit which includes at least a DC switch, and which is configured to operably control the conduction or non-conduction between a transmission interface pin and a supply node; a wireless power unit which is coupled between a wireless receiver coil and the supply node, and which is configured to operably receive a wireless input voltage through the wireless receiver coil; a capacitive power conversion unit which is coupled between the supply node and a charging node, the capacitive power conversion unit including plural capacitive power conversion switches which are configured to operably switch at least one conversion capacitor; and a switching power conversion unit which is coupled between the supply node and the charging node, the switching power conversion unit including at least one switching power conversion switch which is configured to operably control an inductor; wherein the charging apparatus operates in at least one of the following modes: (1) in a constant current mode, the DC switch circuit conducts a DC input current from the transmission interface pin to generate a predetermined bus current through the supply node, or the wireless power unit converts the wireless input voltage to generate the predetermined bus current through the supply node; wherein the capacitive power conversion unit converts the predetermined bus current from the supply node to generate a predetermined constant charging current through the charging by capacitive power conversion to charge a battery coupled to the charging node by constant current, wherein the predetermined constant charging current is substantially the predetermined bus current multiplied by a predetermined current factor, and the predetermined current factor is larger than 1; (2) in a constant voltage mode, the DC switch circuit conducts a DC input voltage from the transmission interface pin to generate a predetermined first bus voltage on the supply node, or the wireless power unit converts the wireless input voltage to generate the predetermined first bus voltage on the supply node; wherein the switching power conversion unit converts the predetermined first bus voltage from the supply node to generate a predetermined charging voltage on the charging node by switching power conversion to charge the battery by constant voltage; (3) in a trickle current mode, the DC switch circuit conducts the DC input voltage from the transmission interface pin to generate the predetermined first bus voltage on the supply node, or the wireless power unit converts the wireless input voltage to generate the predetermined first bus voltage on the supply node; wherein the switching power conversion unit converts the predetermined first bus voltage from the supply node to generate a predetermined trickle charging current through the charging node by switching power conversion to charge the battery by trickle current; (4) in a first power output mode, the switching power conversion unit converts a voltage of the battery from the charging node to generate a predetermined second bus voltage on the supply node by switching power conversion; wherein the DC switch circuit conducts the predetermined second bus voltage from the supply node to generate an output voltage on the transmission interface pin; (5) in a second power output mode, the capacitive power conversion unit converts the voltage of the battery from the charging node to generate the predetermined second bus voltage on the supply node by capacitive power conversion, and the DC switch circuit converts the predetermined second bus voltage from the supply node to generate the output voltage on the transmission interface pin, wherein the second bus voltage is substantially is a voltage of the battery multiplied by a predetermined voltage factor, and the predetermined voltage factor is larger than 1; or (6) in a third power output mode, the wireless power unit converts the wireless input voltage to generate the predetermined second bus voltage on the supply node, and the DC switch circuit converts the predetermined second bus voltage from the supply node to generate the output voltage on the transmission interface pin.

In one embodiment, a power delivery unit converts an input power to the DC input current through the transmission interface pin or the DC input voltage on the transmission interface pin, and the power delivery unit regulates the DC input current to a predetermined input current level to generate the corresponding predetermined bus current through the supply node, or regulates the DC input voltage to a predetermined input voltage level to generate the corresponding predetermined first bus voltage on the supply node.

In one embodiment, the charging apparatus further comprises a DC switch control circuit which is configured to operably control the DC switch circuit, wherein the DC switch control circuit controls the DC switch circuit to be non-conductive when the DC input voltage on the transmission interface pin exceeds an over voltage threshold to protect a circuit coupled to the supply node.

In one embodiment, the DC switch circuit includes a first DC switch and a second DC switch, wherein a body diode of the first DC switch and a body diode of the second DC switch are coupled reversely with each other to block a parasitic body current of the body diode of the first DC switch or of the body diode of the second DC switch.

In one embodiment, the wireless power unit includes: a rectifier circuit which is coupled to the wireless receiver coil, configured to operably rectify the wireless input voltage to a rectified voltage; at least one wireless power conversion transistor, coupled between the rectified voltage and the supply node; and a wireless charging control circuit, configured to operably control the wireless power conversion transistor to convert the rectified voltage to generate the predetermined first bus voltage on the supply node or the predetermined bus current through the supply node.

In one embodiment, the capacitive power conversion unit further includes a conversion control circuit configured to operably control the plural conversion switches, wherein the conversion control circuit operates the plural conversion switches so as to electrically connect the at least one conversion capacitor between a pair of nodes selected from at least one charging voltage division node, the supply node, and a ground node periodically during the plural conversion time periods to convert the predetermined first bus voltage from the supply node to generate the predetermined constant charging current or the predetermined charging voltage on the charging node, or to convert the voltage of the battery from the charging node to generate the predetermined second bus voltage on the supply node; wherein the charging node is coupled to one of the at least one charging voltage division node.

In one embodiment, the at least one conversion capacitor includes a first conversion capacitor and a second conversion capacitor, and the plural conversion time periods include a first conversion time periods and a second conversion time period; wherein the conversion control circuit operates the conversion switches so as to electrically connect a first node of the first conversion capacitor to the supply node and the charging node during the first conversion time period and the second conversion time period respectively, and electrically connect a second node of the first conversion capacitor to the charging node and the ground node during the first conversion time period and the second conversion time period respectively, and electrically connect a first node of the second conversion capacitor to the supply node and the charging node during the second conversion time period and the first conversion time period respectively, and electrically connect a second node of the second conversion capacitor to the charging node and the ground node during the second conversion time period and the first conversion time period respectively, such that the constant charging current is substantially 2 times the predetermined bus current, or that the second bus voltage is substantially 2 times the voltage of the battery.

In one embodiment, the inductor is coupled between a switching node and the charging node and the at least one switching power conversion switch includes: an upper switch, coupled between the supply node and the switching node; and a lower switch, coupled between the switching node and a ground node; wherein the switching power conversion unit further includes a switching control circuit, configured to operably control the upper switch and the lower switch by buck, boost, or buck-boost switching power conversion to generate the predetermined charging voltage on the charging node or the predetermined trickle charging current through the charging node, or to generate the predetermined second bus voltage on the supply node by switching power conversion.

In one embodiment, the charging apparatus further comprises a power path transistor coupled in series between the inductor and the charging node, wherein a first terminal of the power path transistor and the inductor are directly connected to a power receiving node, and a second terminal of the power path transistor is directly connected to the charging node; wherein a system circuit is powered by a system voltage on the power receiving node.

In one embodiment, the power path transistor controls a voltage difference between the system voltage and the voltage of the battery, such that the system voltage is not lower than a predetermined system voltage threshold.

In one embodiment, the power path transistor controls a voltage difference between the system voltage and the voltage of the battery to generate the predetermined charging voltage on the charging node or the predetermined trickle charging current through the charging node to charge the battery.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
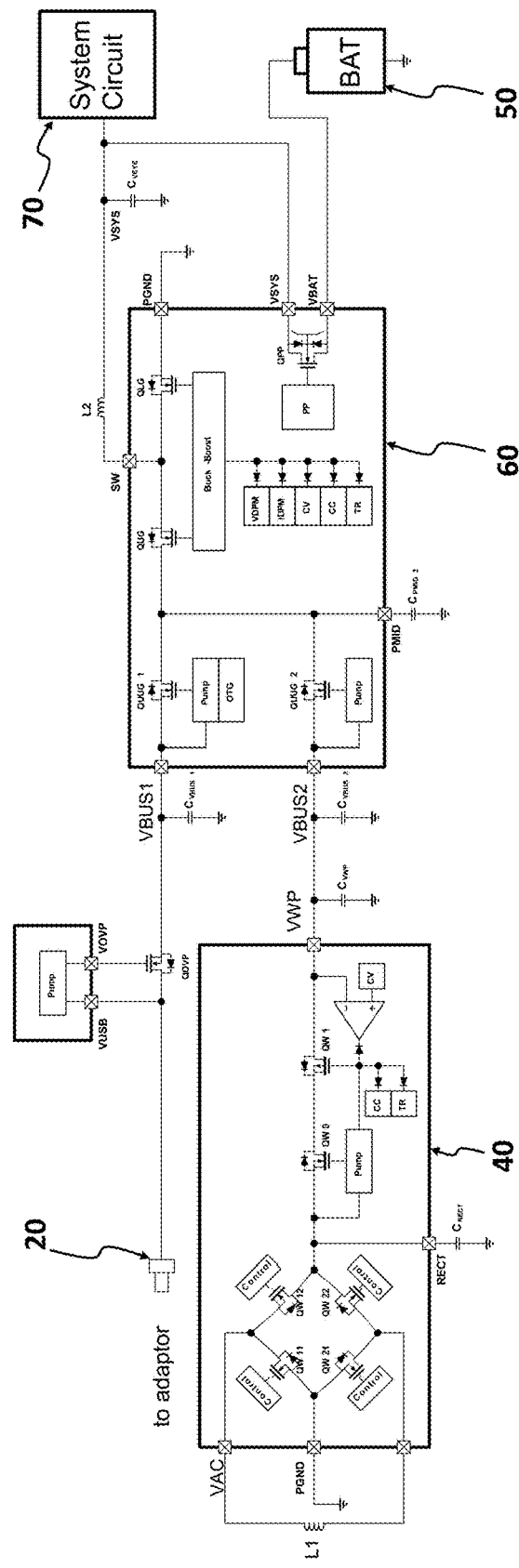
FIG. 1 shows a block diagram of a prior art charging apparatus.
Figure 2A:
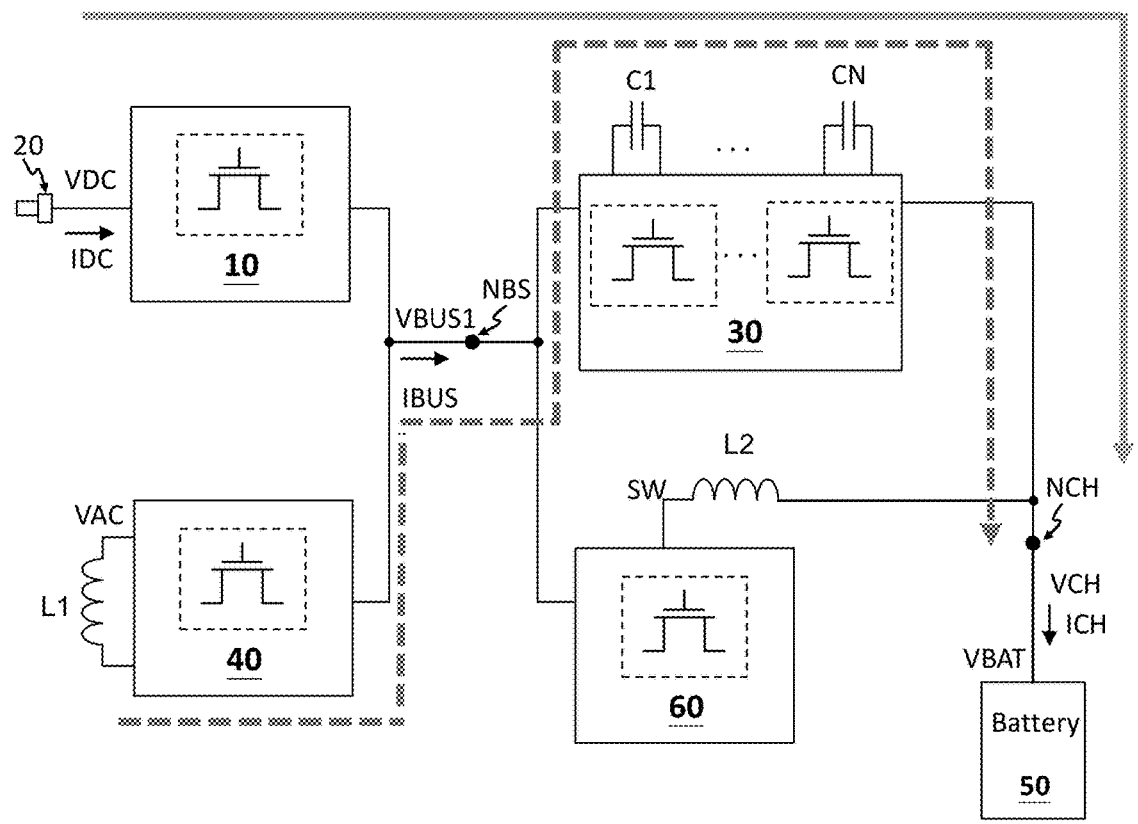
FIGS. 2A-2F show block diagrams of embodiments of the charging apparatus according to the present invention and the multiple power paths thereof.

FIGS. 2A-2F show block diagrams of embodiments of the charging apparatus according to the present invention and the multiple power paths thereof. As shown in FIG. 2A, the charging apparatus 2 comprises a DC switch circuit 10, a wireless power unit 40, a capacitive power conversion unit 30, and a switching power conversion unit 60. The DC switch circuit 10, including at least a DC switch, is configured to operably control the conduction or non-conduction between a transmission interface pin 20 and a supply node NBS. The wireless power unit 40 is coupled between a wireless receiver coil L1 and the supply node NBS, and is configured to operably receive a wireless input voltage VAC through the wireless receiver coil L1. The capacitive power conversion unit 30 is coupled between the supply node NBS and a charging node NCH, and includes plural capacitive power conversion switches which are configured to operably switch at least one conversion capacitor (for example C1-CN as shown in the figure, wherein N is a natural number). The switching power conversion unit 60 is coupled between the supply node NBS and the charging node NCH, and includes at least one switching power conversion switch which is configured to operably switch the inductor L2.

According to the present invention, the charging apparatus 2 can operate in several modes with the configuration described above, which will be explained in detail below.

Still referring to FIG. 2A, in one embodiment, in a constant current mode, the DC switch circuit 10 conducts a DC input current IDC from the transmission interface pin 20 to generate a predetermined bus current IBUS through the supply node NBS (as shown by the power path indicated by the grey solid arrow in the figure). In another embodiment, the wireless power unit 40 converts the wireless input voltage VAC to generate the predetermined bus current IBUS through the supply node NBS (as shown by the power path indicated by the grey dash arrow in the figure). The transmission interface pin 20 may be for example the VBUS pin compliant to the USB or USB PD specification.

Still referring to FIG. 2A, in this embodiment, the capacitive power conversion unit 30 converts the predetermined bus current IBUS from the supply node NBS to a predetermined constant charging current ICH through the charging node NCH by capacitive power conversion, to charge a battery 50 coupled to the charging node NCH by constant current. The predetermined constant charging current ICH is substantially the predetermined bus current IBUS multiplied by a predetermined factor K. In a preferred embodiment, the predetermined factor K is larger than 1.

Also note that: although it is intended to regulate the charging current ICH substantially to be the predetermined bus current IBUS multiplied by a predetermined factor K, however due to non-idealities caused by for example imperfect manufacture of components or imperfect matching among components, the actual level of the charging current ICH may not be exactly equal to K times IBUS, but just close to K times, so the term "substantially" is used to express that there can be a reasonable range of tolerance, the same hereinafter when using "substantially" in other occasions.

According to the present invention, since the predetermined constant charging current ICH is substantially the predetermined bus current IBUS multiplied by a predetermined factor K, a smaller bus current IBUS (such as 4 A) can be converted to a larger charging current ICH (such as 8 A, if K=2), whereby the charging time is much shortened, a standard cable (such as a standard USB cable connected to the transmission interface pin 20) can be used for charging, or with a wireless power source, a higher wireless power conversion efficiency can be achieved because only a smaller output current provided by the wireless power unit is required (the bus current IBUS being provided by the wireless power unit 40 in this case).

Figure 2B:
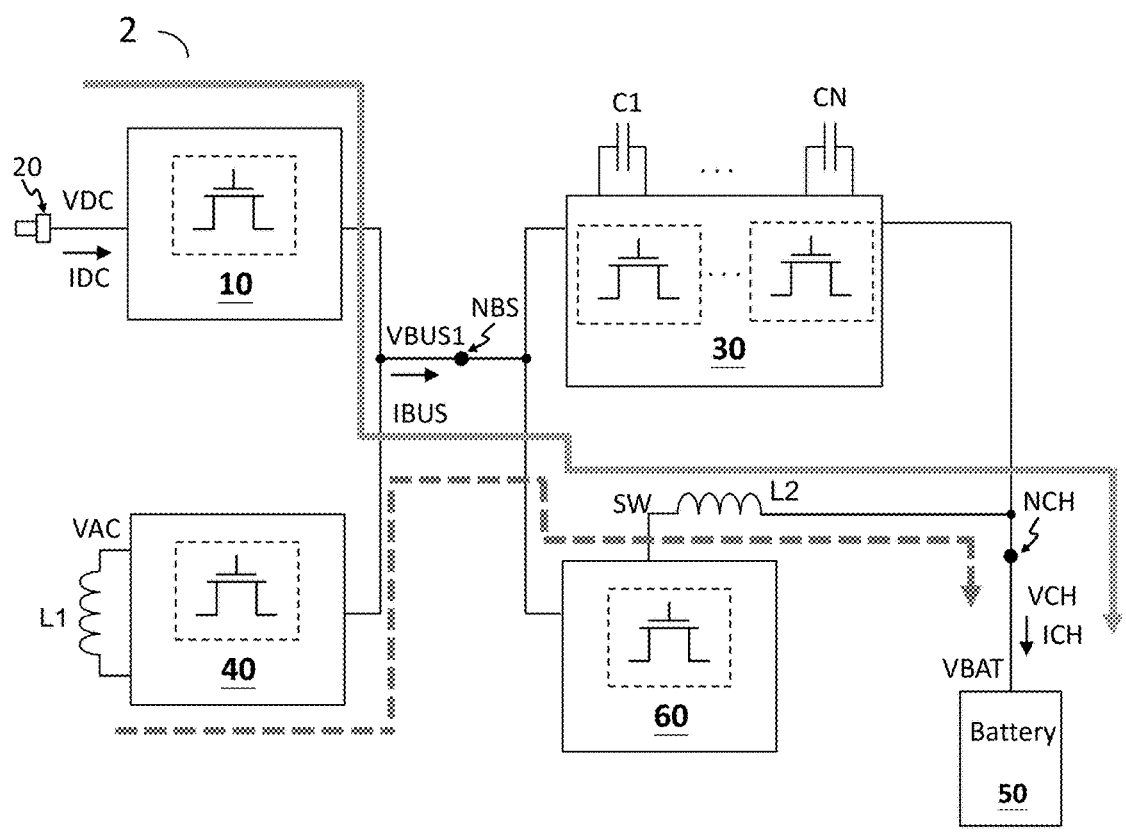

Referring to FIG. 2B, in one embodiment, in a constant voltage mode, the DC switch circuit 10 conducts a DC input voltage VDC from the transmission interface pin 20 to generate a predetermined first bus voltage VBUS1 on the supply node NBS (as shown by the power path indicated by the grey solid arrow in the figure). In another embodiment, the wireless power unit 40 converts the wireless input voltage VAC to generate the predetermined first bus voltage VBUS1 on the supply node NBS (as shown by the power path indicated by the grey dash arrow in the figure).

Referring to FIG. 2B, in this embodiment, the switching power conversion unit 60 converts the predetermined first bus voltage VBUS1 from the supply node NBS to a predetermined charging voltage VCH on the charging node NCH by switching power conversion, to charge the battery 50 by a constant voltage.

Figure 2C:
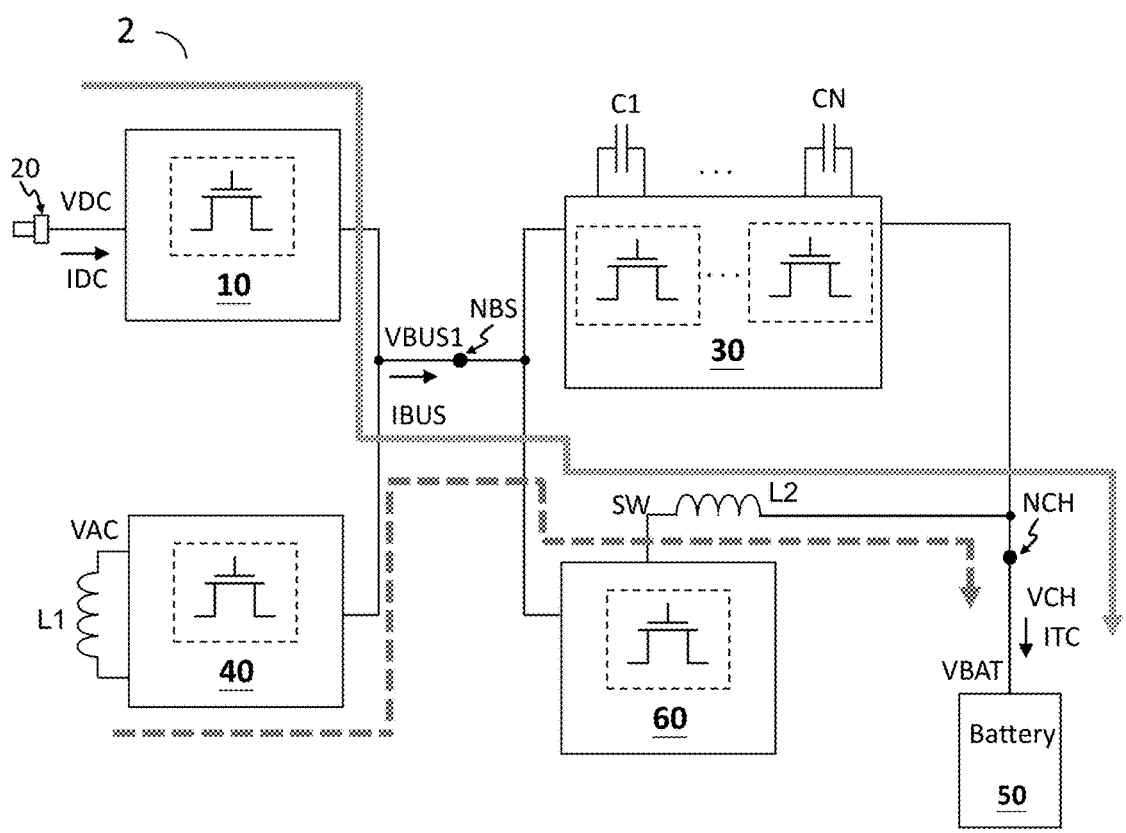

Referring to FIG. 2C, in one embodiment, in a trickle current mode, the DC switch circuit 10 conducts the DC input voltage VDC from the transmission interface pin 20 to generate the predetermined first bus voltage VBUS1 on the supply node NBS (as shown by the power path indicated by the grey solid arrow in the figure). In another embodiment, the wireless power unit 40 converts the wireless input voltage VAC to generate the predetermined first bus voltage VBUS1 on the supply node NBS (as shown by the power path indicated by the grey dash arrow in the figure).

Still referring to FIG. 2C, in this embodiment, the switching power conversion unit 60 converts the predetermined first bus voltage VBUS1 from the supply node NBS to generate a predetermined trickle charging current ITC through the charging node NCH by switching power conversion to charge the battery 50 by trickle current.

Figure 2D:
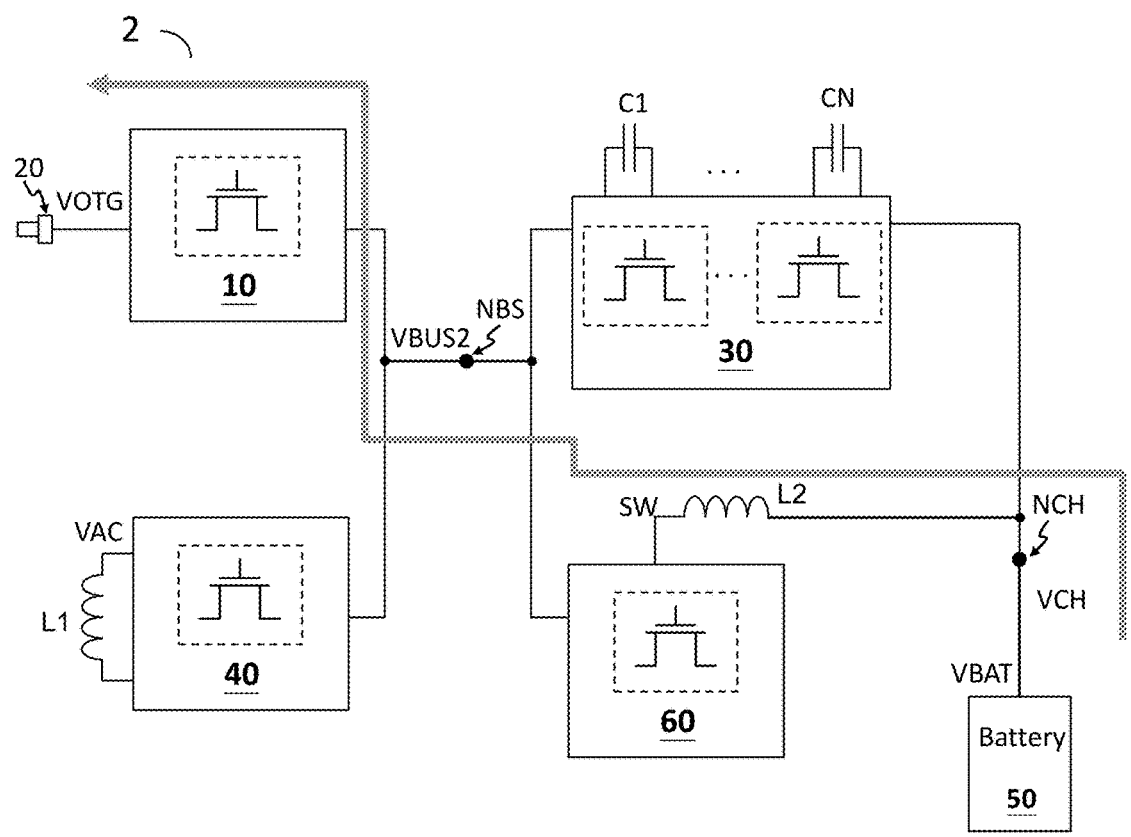

Referring to FIG. 2D, in one embodiment, in a power output mode, the switching power conversion unit 60 converts a battery voltage VBAT of the battery 50 from the charging node NCH to generate a predetermined second bus voltage VBUS2 on the supply node NBS by switching power conversion (as shown by the power path indicated by the grey solid arrow in the figure). In this embodiment, the DC switch circuit 10 conducts the predetermined second bus voltage VBUS2 from the supply node NBS to generate an output voltage VOTG on the transmission interface pin 20. In this embodiment, the power output mode for example may comply with the USB OTG (On-The-Go) specification, wherein the battery can supply power to an external circuit (such as a USB flash disk) through the transmission interface pin 20.

Figure 2E:
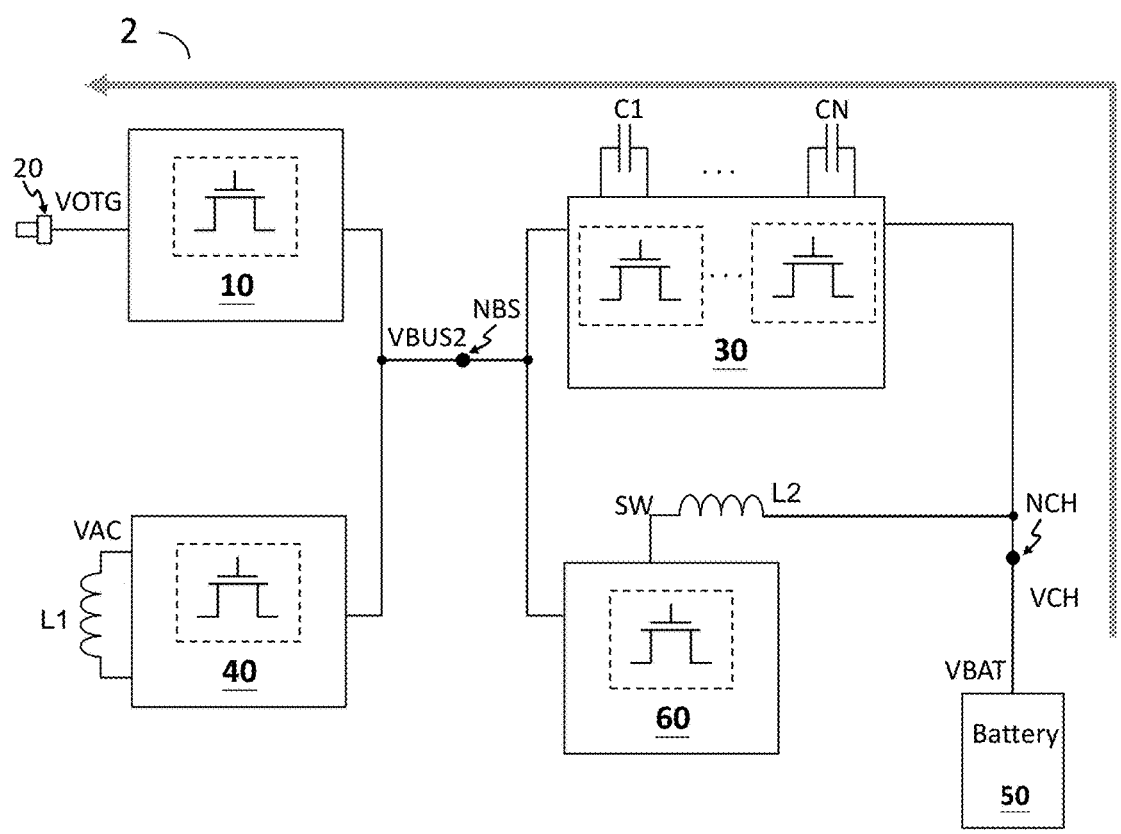

Besides, according to the present invention, the output voltage VOTG can be provided alternatively through other power paths. Referring to FIG. 2E, in this embodiment, in another power output mode, the capacitive power conversion unit 30 converts the battery voltage VBAT of the battery 50 from the charging node NCH to generate the predetermined second bus voltage VBUS2 on the supply node NBS by capacitive power conversion (as shown by the power path indicated by the grey solid arrow in the figure). Still referring to FIG. 2E, in this embodiment, the DC switch circuit 10 converts the predetermined second bus voltage VBUS2 from the supply node NBS to generate the output voltage VOTG on the transmission interface pin 20. In this embodiment, the second bus voltage VBUS2 is substantially the battery voltage VBAT of the battery 50 multiplied by a predetermined factor J. In one preferred embodiment, the predetermined factor J is larger than 1.

Figure 2F:
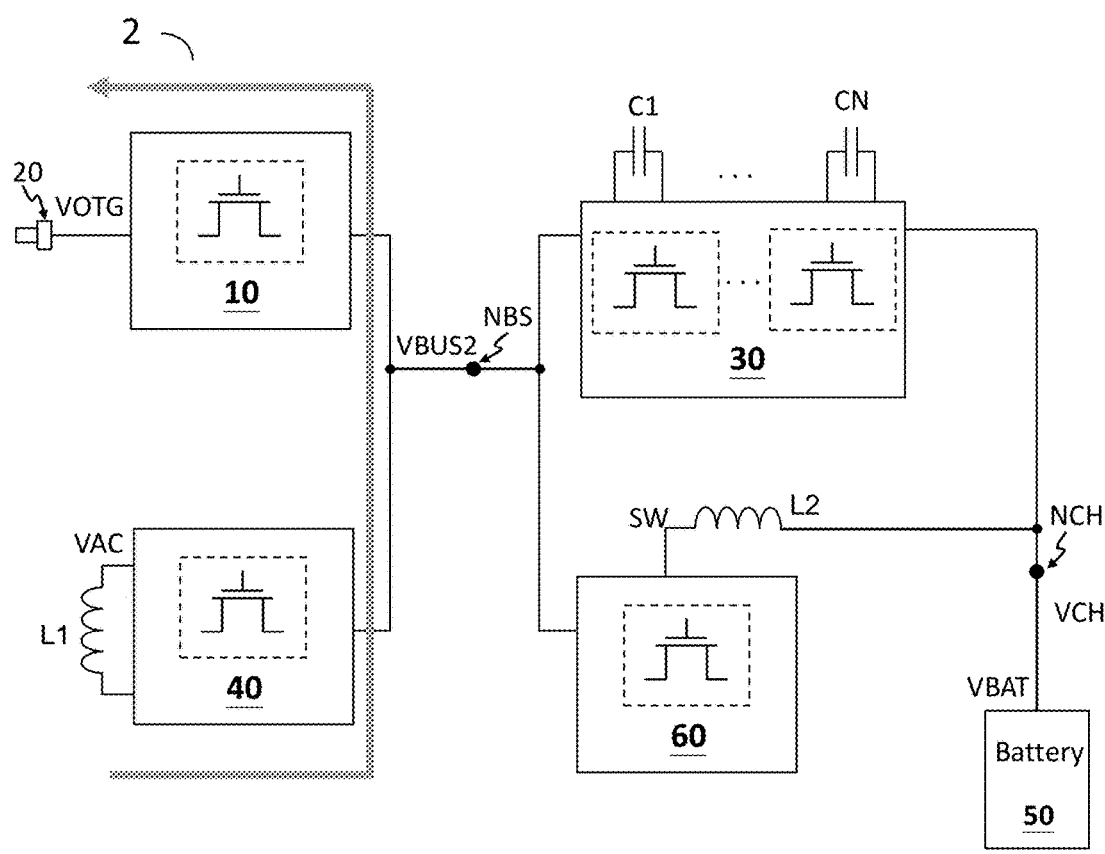

Referring to FIG. 2F, in this embodiment, in another power output mode, the wireless power unit 40 converts the wireless input voltage VAC to generate the predetermined second bus voltage VBUS2 on the supply node NBS, and the DC switch circuit 10 converts the predetermined second bus voltage VBUS2 from the supply node NBS to generate the output voltage VOTG on the transmission interface pin 20 by for example but not limited to conducting VBUS2 directly to VOTG or converting VBUS2 to VOTG by linear power conversion (as shown by the power path indicated by the grey solid arrow in the figure).

As described above, in response to different requirements for charging or providing output power, the charging apparatus of the present invention can charge the battery 50 with various modes or convert the battery power to supply power to external circuits through multiple power paths; hence the charging apparatus of the present invention is multi-functional, highly flexible, and achieves an optimized balance among the requirements of shortening battery charging time, using a standard cable, and improving power conversion efficiency.

Figure 3:
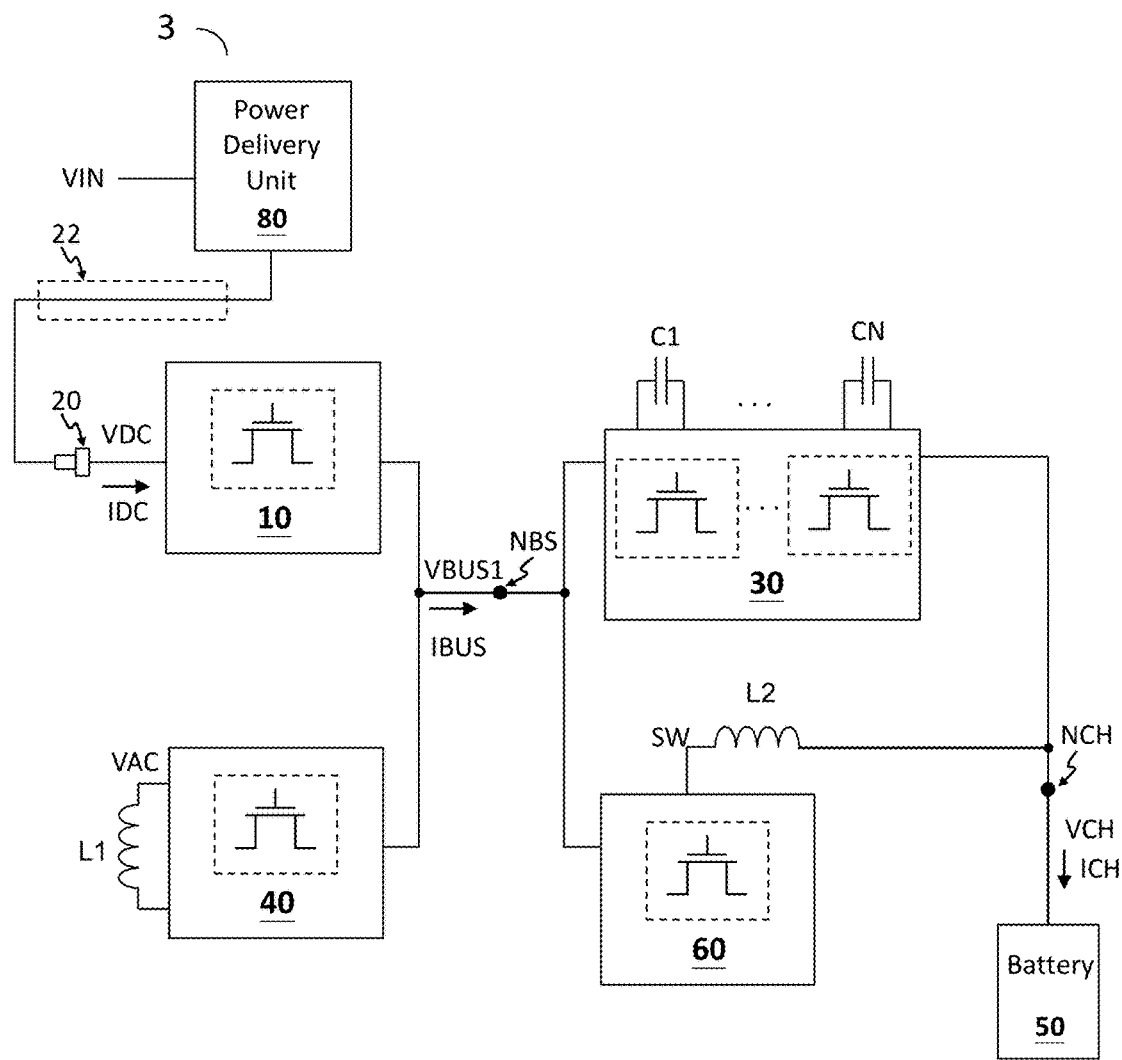
FIG. 3 shows a block diagram of another embodiment of the charging apparatus with multiple power paths according to the present invention.

FIG. 3 shows a block diagram of another embodiment of the charging apparatus with multiple power paths according to the present invention (charging apparatus 3). In one embodiment, a power delivery unit 80 converts an input power VIN to the DC input current IDC or the DC input voltage VDC through the transmission interface pin 20, and the power delivery unit 80 regulates the DC input current IDC to a predetermined input current level, or regulates the DC input voltage VDC to a predetermined input voltage level to generate the corresponding predetermined bus current IBUS or the corresponding predetermined first bus voltage VBUS1 on the supply node NBS. The power delivery unit 80 may be for example an adaptor which converts the input power VIN in an AC form to the DC input current IDC or the DC input voltage VDC. In another embodiment, the power delivery unit 80 may be for example a DC-DC converter circuit which converts a DC form input power VIN provided by for example a power bank to the aforementioned DC input current IDC or the DC input voltage VDC. In one embodiment, the power delivery unit 80 may be connected to the DC switch circuit 10 through the transmission interface pin 20 by a cable 22 (such as a USB cable). In one embodiment, the cable 22 may be omitted and the power delivery unit 80 is directly connected to the transmission interface pin 20.

Figure 4A:
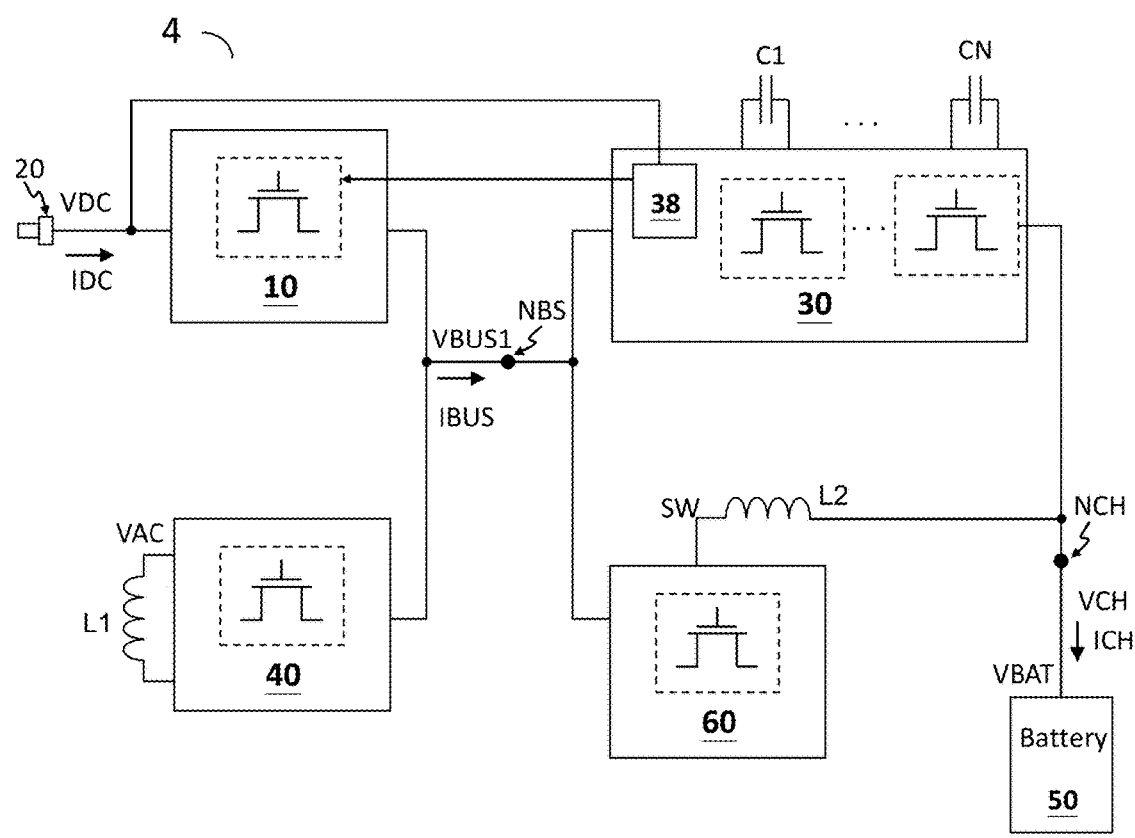
FIG. 4A shows a block diagram of another embodiment of the charging apparatus with multiple power paths according to the present invention.

FIG. 4A shows a block diagram of an embodiment of the charging apparatus with multiple power paths according to the present invention (charging apparatus 4). In this embodiment, the charging apparatus 4 further comprises a DC switch control circuit 38 which is configured to operably control the DC switch circuit 10. The DC switch control circuit 38 controls the DC switch circuit 10 to be OFF when the DC input voltage VDC on the transmission interface pin 20 exceeds an over voltage threshold VOV to protect circuits coupled to the supply node NBS, such as the wireless power unit 40, the capacitive power conversion unit 30, or the switching power conversion unit 60. In one embodiment, as shown in FIG. 4A, the DC switch control circuit 38 may be located in the capacitive power conversion unit 30. However, this is not to limit the scope of the present invention. In other embodiments, the DC switch control circuit 38 may be located outside the capacitive power conversion unit 30.

Figure 4B:
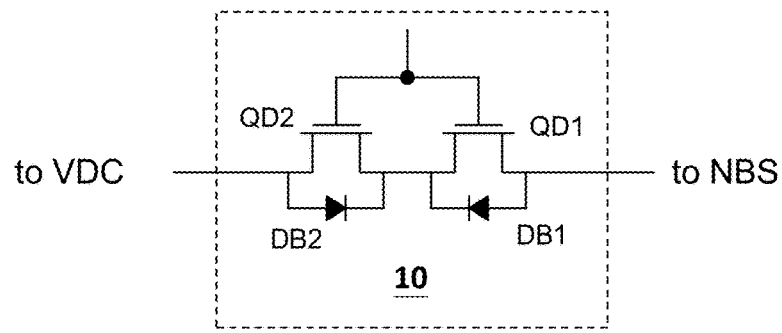
FIGS. 4B-4C show schematic diagrams of embodiments of the DC switch circuit of the charging apparatus according to the present invention.
Figure 4C:
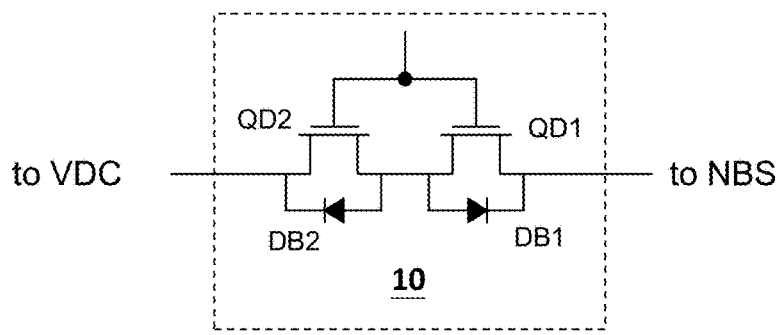

FIGS. 4B-4C show schematic diagrams of embodiments of the DC switch circuit (the DC switch circuit 10) of the charging apparatus according to the present invention. The DC switch circuit 10 includes a first DC switch QD1 and a second DC switch QD2, wherein the body diode DB1 of the first DC switch QD1 is reversely coupled to the body diode DB2 of the second DC switch QD2, whereby the parasitic body current of the body diode (DB1 or DB2) of the DC switch QD1 or QD2 is blocked. This is to solve the problem that: when for example the DC voltage VDC is relatively lower and the bus voltage VBUS is relatively higher (also applicable when opposite), the parasitic body current can occur even when all the aforementioned switches are OFF. The parasitic body current can be avoided by the reverse coupling of the body diodes. In one embodiment, the current outflow nodes of the body diode DB1 and the body diode DB2 are directly connected to each other, as shown in FIG. 4B. In another embodiment, the current inflow nodes of the body diode DB1 and the body diode DB2 are directly connected to each other, as shown in FIG. 4C.

Figure 5:
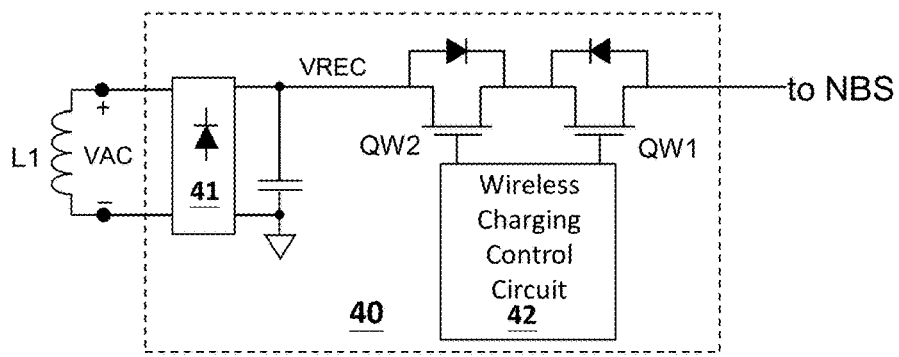
FIG. 5 shows a schematic diagram of an embodiment of the wireless power unit of the charging apparatus with multiple power paths according to the present invention.

FIG. 5 shows a schematic diagram of an embodiment of the wireless power unit (wireless power unit 40) of the charging apparatus with multiple power paths according to the present invention. The wireless power unit 40 includes a rectifier circuit 41, at least one wireless power conversion transistor (e.g. QW1 as shown in the figure), and a wireless charging control circuit 42. The rectifier circuit 41, coupled to the wireless receiver coil L1, is configured to operably rectify the wireless input voltage VAC to generate a rectified voltage VREC. The rectifier circuit 41 may be for example a synchronous or asynchronous type of half-bridge or full-bridge rectifier. The wireless power conversion transistor QW1 is coupled between the rectified voltage VREC and the supply node NBS. The wireless charging control circuit 42 is configured to operably control the wireless power conversion transistor QW1 to convert the rectified voltage VREC to the predetermined first bus voltage VBUS1 on the supply node NBS or the predetermined bus current IBUS through the supply node NBS. In one embodiment, the wireless power unit 40 further includes a reverse blocking transistor QW2 which is coupled in series with the wireless power conversion transistor QW1 to block the parasitic body current of the wireless power conversion transistor QW1, wherein the body diodes of the transistor QW1 and QW2 are coupled reversely to each other. In another embodiment, the reverse blocking transistor QW2 may be omitted. In one embodiment, the wireless power conversion transistor QW1 may be omitted and replaced by a short circuit, in other words, the predetermined first bus voltage VBUS1 is generated directly by the rectifier circuit 41 rectifying the wireless input voltage VAC.

On the current path of the capacitive power conversion unit 30 or the switching power conversion unit 60, reverse blocking transistors as mentioned above can also be provided, to block the parasitic body current possibly occurring in the capacitive power conversion unit 30 or the switching power conversion unit 60.

Figure 6A:
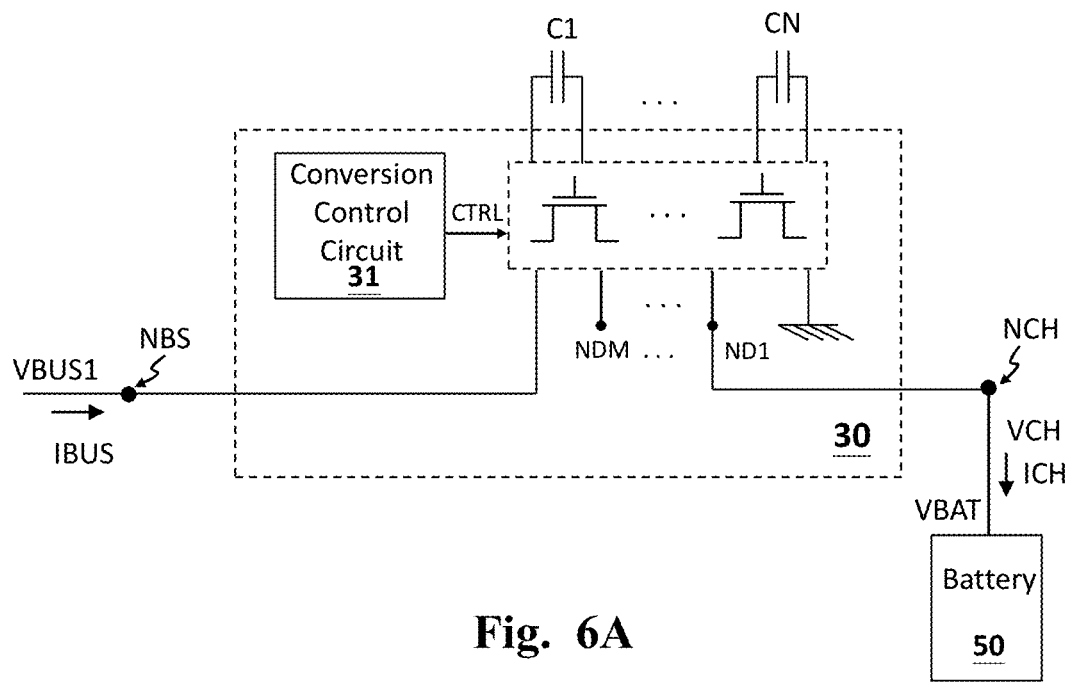
FIGS. 6A-6B show schematic diagrams of embodiments of the capacitive power conversion unit of the charging apparatus according to the present invention.
Figure 6B:
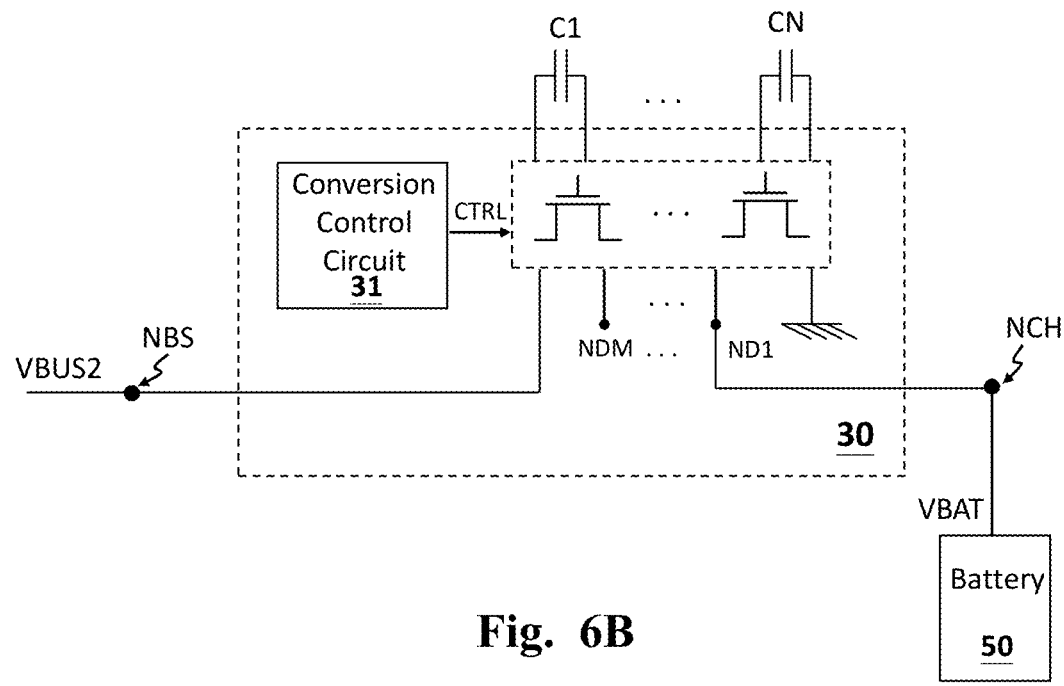

FIGS. 6A-6B show schematic diagrams of embodiments of the capacitive power conversion unit (the capacitive power conversion unit 30) of the charging apparatus according to the present invention. The capacitive power conversion unit 30 further includes a conversion control circuit 31 configured to operably control the plural conversion switches. The conversion control circuit 31 operates the plural conversion switches so as to electrically connect the at least one conversion capacitor between a pair of nodes selected from at least one charging voltage division node (corresponding to for example ND1 or ND1-NDM, wherein M is a natural number), the supply node NBS, and a ground node GND periodically during the plural conversion time periods, to convert the predetermined first bus voltage VBUS1 from the supply node NBS to the predetermined constant charging current ICH on the charging node NCH or the predetermined charging voltage VCH through the charging node NCH, or to convert the battery voltage VBAT of the battery 50 from the charging node NCH to the predetermined second bus voltage VBUS2 on the supply node NBS, such that the predetermined constant charging current ICH is substantially the predetermined bus current IBUS multiplied by a predetermined factor K or that the charging voltage VCH is substantially 1/K of the predetermined bus voltage VBUS1, wherein the charging node NCH is coupled to one of the at least one charging voltage division node (for example ND1 as shown in the figure). In one preferred embodiment, K is a real number larger than 1. In other words, the charging current ICH is higher than the DC input current IDC. Hence, the charging apparatus of the present invention can charge the battery 50 with a lager charger current ICH to shorten the charging time while keeping the DC input current low. In one embodiment, the capacitive power conversion unit 30 can be, for example but not limited to, a divider charge pump, a capacitive divider, or a capacitive current multiplier.

Referring to FIG. 6B, in this embodiment, in a power output mode, the capacitive power conversion unit 30 can operate the plural conversion switches and the at least one conversion capacitor similar to the operation described above to convert the battery voltage VBAT of the battery 50 from the charging node NCH to the predetermined second bus voltage VBUS2 on the supply node NBS, such that the predetermined second bus voltage VBUS2 is substantially the battery voltage VBAT of the battery 50 multiplied by a predetermined factor J, to achieve the power output mode corresponding to the embodiment shown in FIG. 2E.

Figure 7:
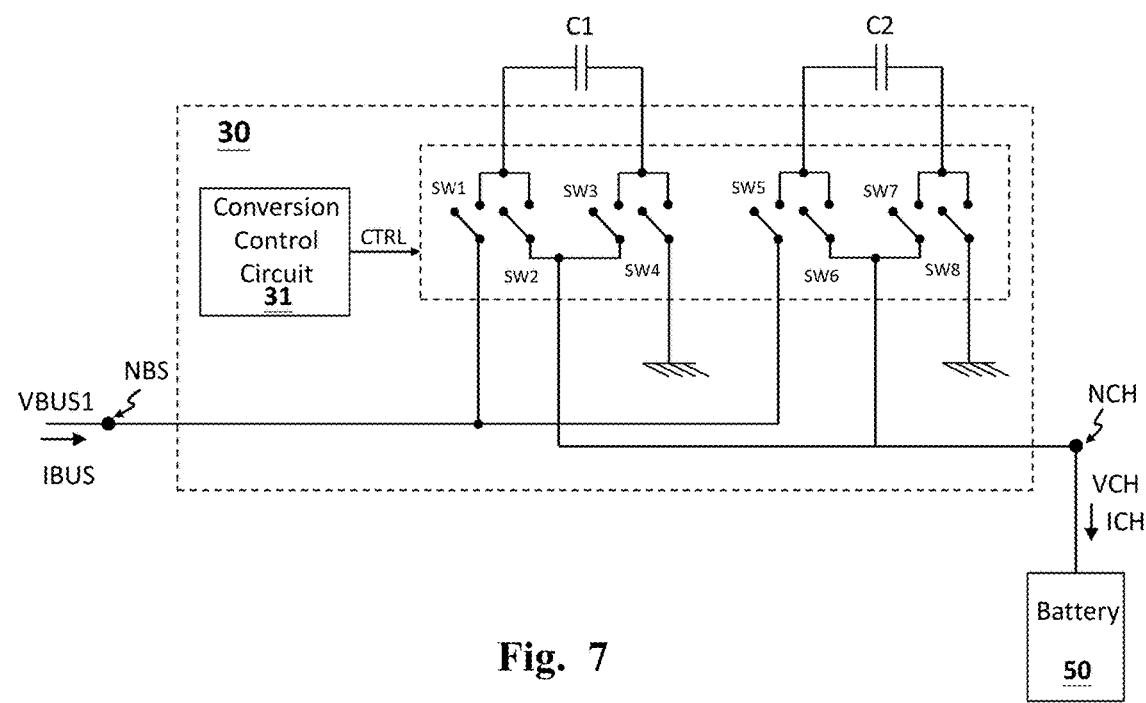
FIG. 7 shows a schematic diagram of a specific embodiment of the capacitive power conversion unit of the charging apparatus according to the present invention.

FIG. 7 shows a schematic diagram of a specific embodiment of the capacitive power conversion unit (the capacitive power conversion unit 30) of the charging apparatus according to the present invention. As shown in FIG. 7, in this embodiment, the conversion capacitors include a first conversion capacitor C1 and a second conversion capacitor C2, and the plural conversion time periods include a first conversion time period and a second conversion time period. In a constant current mode of this embodiment, the conversion control circuit 31 operates the conversion switches (for example but not limited to SW1-SW8 as shown in the figure) so as to electrically connect a first node of the first conversion capacitor C1 to the supply node NBS and the charging node NCH during the first conversion time period and the second conversion time period respectively, and electrically connect a second node of the first conversion capacitor C1 to the charging node NCH and the ground node GND during the first conversion time period and the second conversion time period respectively, and electrically connect a first node of the second conversion capacitor C2 to the supply node NBS and the charging node NCH during the second conversion time period and the first conversion time period respectively, and electrically connect a second node of the second conversion capacitor C2 to the charging node NCH and the ground node GND during the second conversion time period and the first conversion time period respectively, such that the constant charging current ICH is substantially 2 times the predetermined bus current IBUS, or that the second bus voltage VBUS2 is substantially 2 times the battery voltage VBAT of the battery 50.

The embodiment shown in FIG. 7 can perform a similar switching operation to achieve the power output mode corresponding to the embodiment shown in FIG. 2E.

Figure 8A:
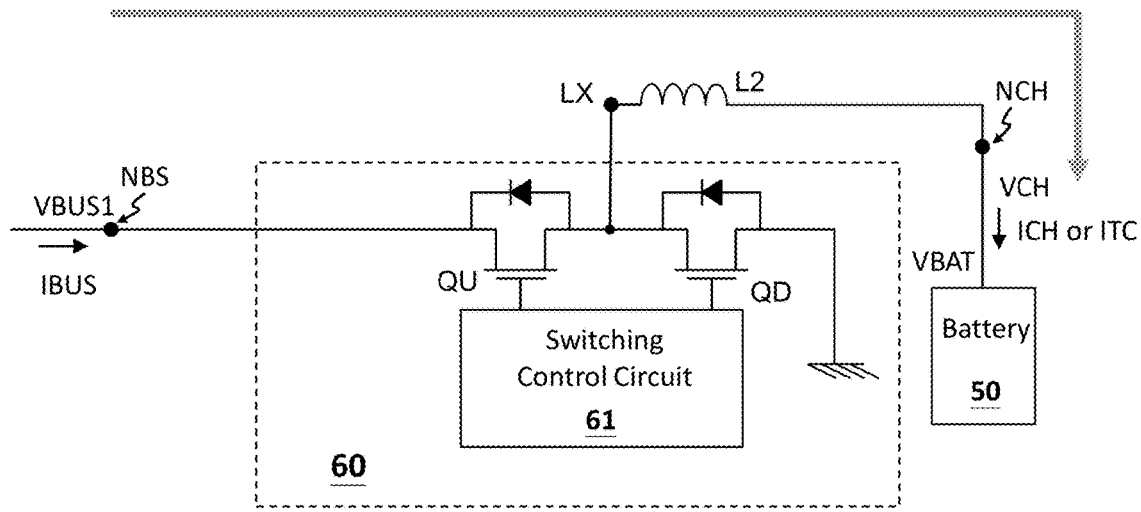
FIGS. 8A-8B show schematic diagrams of specific embodiments of the switching power conversion unit of the charging apparatus according to the present invention and the multiple power paths thereof.
Figure 8B:
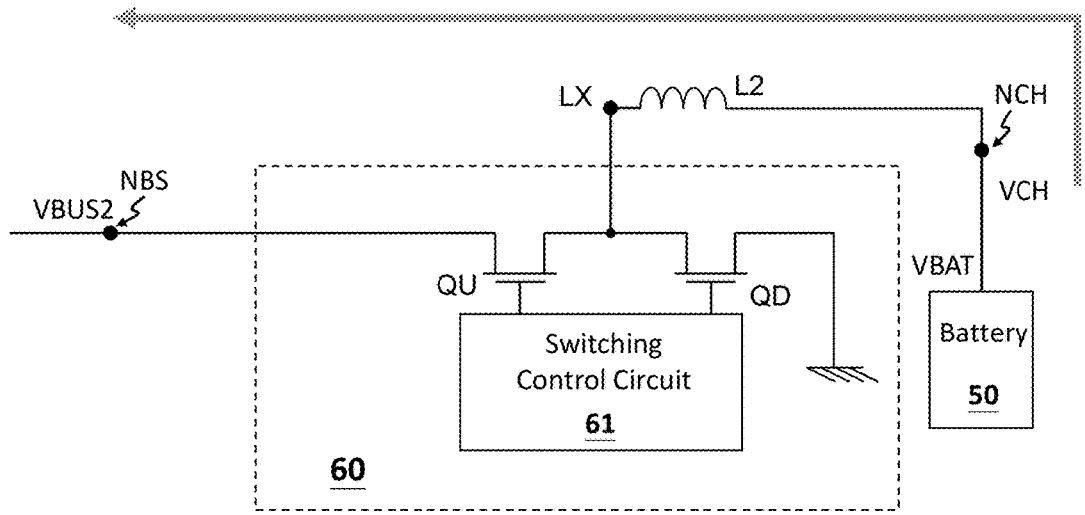

FIGS. 8A-8B show schematic diagrams of specific embodiments of the switching power conversion unit (switching power conversion unit 60) of the charging apparatus according to the present invention. As shown in FIGS. 8A-8B, in this embodiment, the inductor L2 is coupled between a switching node LX and the charging node NCH. The switching power conversion switches includes an upper switch QU and a lower switch QD. The upper switch QU is coupled between the supply node NBS and the switching node LX. The lower switch QD is coupled between the switching node LX and the ground node GND. The switching power conversion unit 60 further includes a switching control circuit 61 which is configured to operably control the upper switch QU and the lower switch QD. Also referring to FIGS. 2B-2D, in one embodiment, the switching power conversion unit 60 is configured to operably generate the predetermined charging voltage VCH on the supply node NBS or the predetermined trickle charging current ITC through the charging node NCH to charge the battery 50 (as shown in FIGS. 8A and 2B-2C). In another embodiment, the switching power conversion unit 60 can generate the predetermined second bus voltage VBUS2 on the supply node NBS by switching power conversion (as shown in FIGS. 8B and 2D), so as to generate the output voltage VOTG. The output voltage VOTG can be an output voltage compliant to for example USB PD specification. From one perspective, the switching power conversion unit 60 of for example FIG. 8A operates in a step-down (buck) switching power conversion mode when in the constant voltage mode or the trickle current mode. On the other hand, the switching power conversion unit 60 of for example FIG. 8B operates in a step-up (boost) switching power conversion mode when in the power output mode. The aforementioned "switching power conversion" is not limited to being achieved by the step-down switching power converter configuration (in view of the charging direction) as shown in the previous figures. In other embodiments, the switching power conversion scheme can alternatively be achieved by a step-up or a buck-boost switching power converter configuration. Furthermore, the switching control circuit 61 can control the switching power conversion unit 60 to operate in the constant current mode or the constant voltage mode by switching power conversion to meet various different requirements, as described above.

Figure 9:
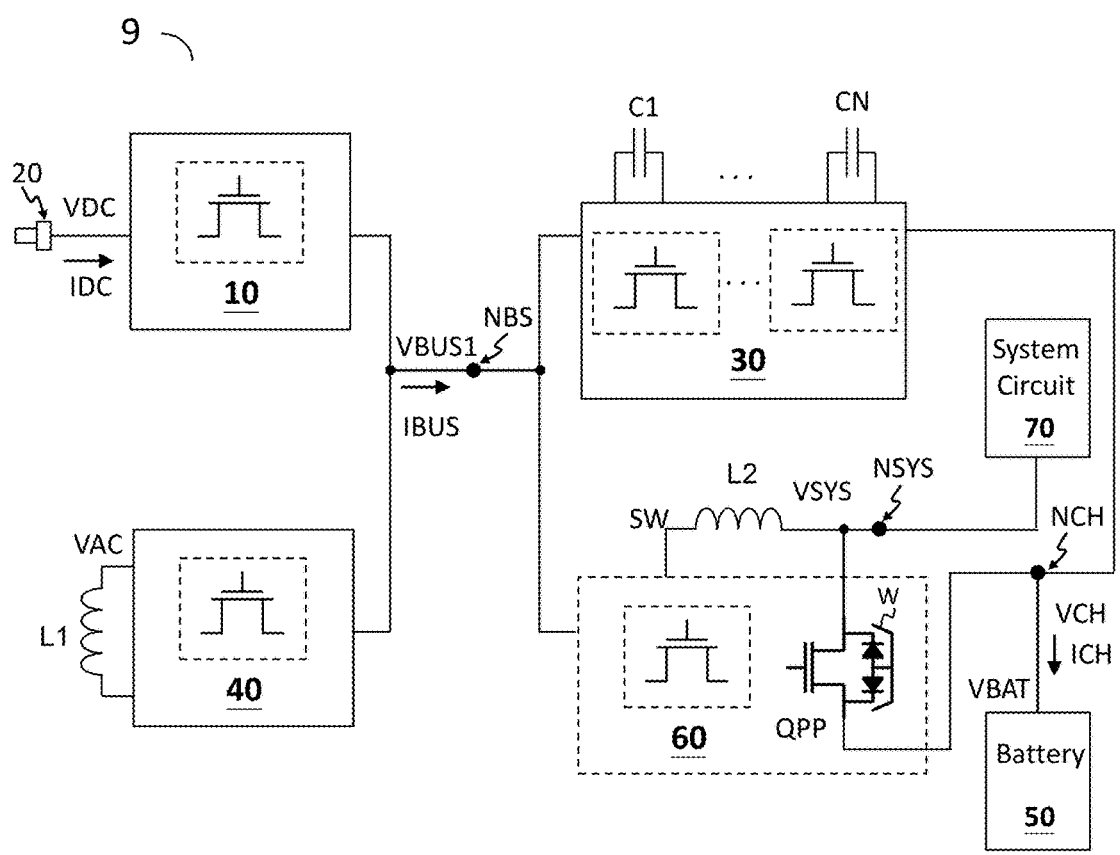
FIG. 9 shows a block diagram of another embodiment of the charging apparatus with multiple power paths according to the present invention and a schematic diagram of the power path transistor thereof.

FIG. 9 shows a block diagram of an embodiment of the charging apparatus (the charging apparatus 9) with multiple power paths according to the present invention. The charging apparatus 9 is similar to the charging apparatus 2 shown in FIGS. 2A-2F but further comprises a power path transistor QPP coupled in series between the inductor L2 and the charging node NCH, wherein a first terminal of the power path transistor QPP and the inductor L2 are directly connected to a power receiving node NSYS, and a second terminal of the power path transistor QPP is directly connected to the charging node NCH. In one embodiment, a system circuit 70 is powered by a system voltage VSYS on the power receiving node NSYS. In one embodiment, the power path transistor QPP controls a voltage difference between the system voltage VSYS and the battery voltage VBAT of the battery 50, such that the system voltage VSYS is not lower than a predetermined system voltage threshold VTH. In one embodiment, the power path transistor QPP can be controlled to be conductive such that the battery voltage VBAT or the charging voltage VCH is electrically connected directly to the system voltage VSYS. In one embodiment, the conduction level of the power path transistor QPP can be controlled according to the battery voltage VBAT of the battery 50 or the power requirement of the system circuit 70. As an example, the power path transistor QPP can be controlled to adjust its conduction resistance or to regulate the charging voltage VCH on the charging node NCH in constant voltage mode, or to regulate the charging current ICH or the trickle charging current ITC through the charging node NCH to charge the battery 50 in constant current mode or trickle current mode.

Still referring to FIG. 9, in one embodiment, the power path transistor can be one single transistor. In another embodiment, the power path transistors can include plural transistors. In one embodiment, as shown in the figure, the power path transistor QPP includes a well region whose bias level is adjustable, for example by switching the connection of the well region to the drain or the source of the power path transistor QPP according to the relation between the drain voltage and the source voltage of the power path transistor QPP or the current direction of the power path transistor QPP.

In the case that the charging apparatus of the present invention comprises the power path transistor QPP and the system circuit 70, the charging apparatus 9 still can perform the aforementioned various operations, including for example but not limited to the constant current mode, the constant voltage mode, the trickle current mode, and the power output mode as shown in FIGS. 2A-2F. In other words, the charging apparatus 9 can also operate with the power sources and the power conversion paths as shown in FIGS. 2A-2F.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As an example, in the embodiments described above, in the constant current mode, the power conversion is executed by the capacitive power conversion unit 30 to charge the battery by constant current. However, this embodiment is only example and not to limit the broadest scope of the present invention. The power conversion can alternative be executed by the switching power conversion unit 60 in the constant current mode to charge the battery by constant current. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A charging apparatus, comprising:
    a DC switch circuit which includes at least a DC switch, and which is configured to operably control the conduction or non-conduction between a transmission interface pin and a supply node;
    a wireless power unit which is coupled between a wireless receiver coil and the supply node, and which is configured to operably receive a wireless input voltage through the wireless receiver coil;
    a capacitive power conversion unit which is coupled between the supply node and a charging node, the capacitive power conversion unit including plural capacitive power conversion switches which are configured to operably switch at least one conversion capacitor; and
    a switching power conversion unit which is coupled between the supply node and the charging node, the switching power conversion unit including at least one switching power conversion switch which is configured to operably control an inductor;
    wherein the charging apparatus operates in at least one of the following modes:
        (1) in a constant current mode, the DC switch circuit conducts a DC input current from the transmission interface pin to generate a predetermined bus current through the supply node, or the wireless power unit converts the wireless input voltage to generate the predetermined bus current through the supply node;
        wherein the capacitive power conversion unit converts the predetermined bus current from the supply node to generate a predetermined constant charging current through the charging by capacitive power conversion to charge a battery coupled to the charging node by constant current, wherein the predetermined constant charging current is substantially the predetermined bus current multiplied by a predetermined current factor, and the predetermined current factor is larger than 1;

(2) in a constant voltage mode, the DC switch circuit conducts a DC input voltage from the transmission interface pin to generate a predetermined first bus voltage on the supply node, or the wireless power unit converts the wireless input voltage to generate the predetermined first bus voltage on the supply node;

wherein the switching power conversion unit converts the predetermined first bus voltage from the supply node to generate a predetermined charging voltage on the charging node by switching power conversion to charge the battery by constant voltage;

(3) in a trickle current mode, the DC switch circuit conducts the DC input voltage from the transmission interface pin to generate the predetermined first bus voltage on the supply node, or the wireless power unit converts the wireless input voltage to generate the predetermined first bus voltage on the supply node;

wherein the switching power conversion unit converts the predetermined first bus voltage from the supply node to generate a predetermined trickle charging current through the charging node by switching power conversion to charge the battery by trickle current;

(4) in a first power output mode, the switching power conversion unit converts a voltage of the battery from the charging node to generate a predetermined second bus voltage on the supply node by switching power conversion;

wherein the DC switch circuit conducts the predetermined second bus voltage from the supply node to generate an output voltage on the transmission interface pin;

(5) in a second power output mode, the capacitive power conversion unit converts the voltage of the battery from the charging node to generate the predetermined second bus voltage on the supply node by capacitive power conversion, and the DC switch circuit converts the predetermined second bus voltage from the supply node to generate the output voltage on the transmission interface pin, wherein the second bus voltage is substantially is a voltage of the battery multiplied by a predetermined voltage factor, and the predetermined voltage factor is larger than 1; or (6) in a third power output mode, the wireless power unit converts the wireless input voltage to generate the predetermined second bus voltage on the supply node, and the DC switch circuit converts the predetermined second bus voltage from the supply node to generate the output voltage on the transmission interface pin.

2. The charging apparatus as claim 1, wherein a power delivery unit converts an input power to the DC input current through the transmission interface pin or the DC input voltage on the transmission interface pin, and the power delivery unit regulates the DC input current to a predetermined input current level to generate the corresponding predetermined bus current through the supply node, or regulates the DC input voltage to a predetermined input voltage level to generate the corresponding predetermined first bus voltage on the supply node.

3. The charging apparatus as claim 1, further comprising a DC switch control circuit which is configured to operably control the DC switch circuit, wherein the DC switch control circuit controls the DC switch circuit to be non-conductive when the DC input voltage on the transmission interface pin exceeds an over voltage threshold to protect a circuit coupled to the supply node.

4. The charging apparatus as claim 1, wherein the DC switch circuit includes a first DC switch and a second DC switch, wherein a body diode of the first DC switch and a body diode of the second DC switch are coupled reversely with each other to block a parasitic body current of the body diode of the first DC switch or of the body diode of the second DC switch.

5. The charging apparatus as claim 1, wherein the wireless power unit includes:
a rectifier circuit which is coupled to the wireless receiver coil, and which is configured to operably rectify the wireless input voltage to a rectified voltage;
at least one wireless power conversion transistor, coupled between the rectified voltage and the supply node; and
a wireless charging control circuit, configured to operably control the wireless power conversion transistor to convert the rectified voltage to generate the predetermined first bus voltage on the supply node or the predetermined bus current through the supply node.

6. The charging apparatus as claim 1, wherein the capacitive power conversion unit further includes a conversion control circuit configured to operably control the plural conversion switches, wherein the conversion control circuit operates the plural conversion switches so as to electrically connect the at least one conversion capacitor between a pair of nodes selected from at least one charging voltage division node, the supply node, and a ground node periodically during the plural conversion time periods to convert the predetermined first bus voltage from the supply node to generate the predetermined constant charging current through the charging node or the predetermined charging voltage on the charging node, or to convert the voltage of the battery from the charging node to generate the predetermined second bus voltage on the supply node; wherein the charging node is coupled to one of the at least one charging voltage division node.

7. The charging apparatus as claim 6, wherein the at least one conversion capacitor includes a first conversion capacitor and a second conversion capacitor, and the plural conversion time periods include a first conversion time period and a second conversion time period; wherein the conversion control circuit operates the conversion switches so as to electrically connect a first node of the first conversion capacitor to the supply node and the charging node during the first conversion time period and the second conversion time period respectively, and electrically connect a second node of the first conversion capacitor to the charging node and the ground node during the first conversion time period and the second conversion time period respectively, and electrically connect a first node of the second conversion capacitor to the supply node and the charging node during the second conversion time period and the first conversion time period respectively, and electrically connect a second node of the second conversion capacitor to the charging node and the ground node during the second conversion time period and the first conversion time period respectively, such that the constant charging current is substantially 2 times the predetermined bus current, or that the second bus voltage is substantially 2 times the voltage of the battery.

8. The charging apparatus as claim 1, the inductor being coupled between a switching node and the charging node; the at least one switching power conversion switch including:

an upper switch, coupled between the supply node and the switching node; and a lower switch, coupled between the switching node and a ground node;

wherein the switching power conversion unit further includes a switching control circuit, configured to operably control the upper switch and the lower switch by buck, boost, or buck-boost switching power conversion to generate the predetermined charging voltage on the charging node or the predetermined trickle charging current through the charging node, or to generate the predetermined second bus voltage on the supply node by switching power conversion.

9. The charging apparatus as claim 1, further comprising a power path transistor coupled in series between the inductor and the charging node, wherein a first terminal of the power path transistor and the inductor are directly connected to a power receiving node, and a second terminal of the power path transistor is directly connected to the charging node; wherein a system circuit is powered by a system voltage on the power receiving node.

10. The charging apparatus as claim 9, wherein the power path transistor controls a voltage difference between the system voltage and the voltage of the battery, such that the system voltage is not lower than a predetermined system voltage threshold.

11. The charging apparatus as claim 9, wherein the power path transistor controls a voltage difference between the system voltage and the voltage of the battery to generate the predetermined charging voltage on the charging node or the predetermined trickle charging current through the charging node to charge the battery.

* * * * *